(12) United States Patent
Santiago

(10) Patent No.: US 11,009,140 B1
(45) Date of Patent: May 18, 2021

(54) SELF-CLOSING VALVE

(71) Applicant: Air Cruisers Company, LLC, Wall Township, NJ (US)

(72) Inventor: Agapito J. Santiago, Point Pleasant, NJ (US)

(73) Assignee: AIR CRUISERS COMPANY, LLC, Wall Township, NJ (US)

( * ) Notice: Subject to any disclaimer, the term of this patent is extended or adjusted under 35 U.S.C. 154(b) by 0 days.

(21) Appl. No.: 16/789,307

(22) Filed: Feb. 12, 2020

Related U.S. Application Data

(63) Continuation of application No. 15/947,123, filed on Apr. 6, 2018, now abandoned.

(60) Provisional application No. 62/490,695, filed on Apr. 27, 2017.

(51) Int. Cl.
| | |
|---|---|
| *F16K 21/16* | (2006.01) |
| *F16K 31/126* | (2006.01) |
| *B64D 25/14* | (2006.01) |

(52) U.S. Cl.
CPC .............. *F16K 21/16* (2013.01); *B64D 25/14* (2013.01); *F16K 31/126* (2013.01); *B64D 2201/00* (2013.01)

(58) Field of Classification Search
CPC .................................. B63C 9/24; B64D 25/14
USPC .......................................................... 251/294
See application file for complete search history.

(56) References Cited

U.S. PATENT DOCUMENTS

| | | | |
|---|---|---|---|
| 1,827,057 | A | 10/1931 | Wills |
| 2,945,506 | A | 7/1960 | Svensson |
| 5,711,757 | A | 1/1998 | Bryant |
| 6,644,596 | B1 | 11/2003 | Jurlina et al. |
| 9,139,305 | B2 ‡ | 9/2015 | Brown |

OTHER PUBLICATIONS

U.S. Appl. No. 15/947,123, Non-Final Rejection, dated Jul. 31, 2019.

‡ imported from a related application

*Primary Examiner* — Robert K Arundale
(74) *Attorney, Agent, or Firm* — Kilpatrick Townsend & Stockton LLP

(57) ABSTRACT

Embodiments of the present disclosure relate generally to valves that provide controlled inflation. The valves are designed to allow inflation of one or more inflatable devices and to stop inflation once a desired inflation level has been reached. This can allow the valve to be used with a single inflation source in order to inflate a plurality of inflatable devices. In a specific example, this disclosure provides systems and methods for inflating an ejector bag for door-mounted or fuselage-mounted inflatable evacuation slides or slide/rafts used for evacuating passenger vessels, such as aircraft. Other examples relate to sustaining the inflation of individual tubes that communicate with one another in evacuation slides, evacuation slide/rafts, life rafts and/or other inflatable devices.

10 Claims, 12 Drawing Sheets

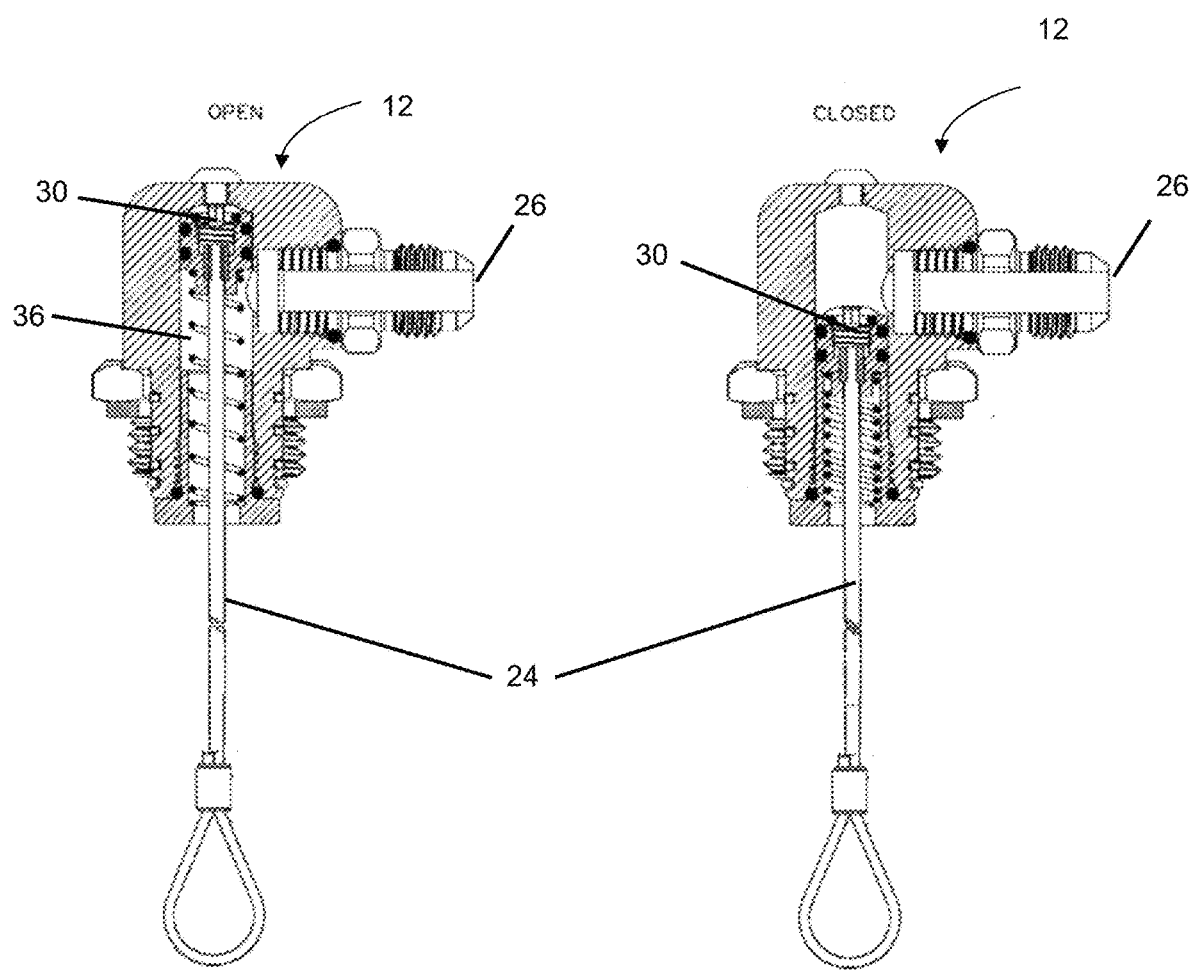

SELF-CLOSING VALVE

CROSS REFERENCE TO RELATED APPLICATIONS

This patent application is a continuation of U.S. Nonprovisional application Ser. No. 15/947,123, filed on Apr. 6, 2018, titled "Self-Closing Valve," which application claims the benefit of U.S. Provisional Application Ser. No. 62/490,695, filed on Apr. 27, 2017, titled "Self Closing Valve," the entire contents of which are hereby incorporated by reference.

FIELD OF THE DISCLOSURE

Embodiments of the present disclosure relate generally to valves that provide controlled inflation. The valves are designed to allow inflation of one or more inflatable devices and to stop inflation once a desired inflation level has been reached. This can allow the valve to be used with a single inflation source in order to inflate a plurality of inflatable devices. In a specific example, this disclosure provides systems and methods for inflating an ejector bag for door-mounted inflatable evacuation slides or evacuation slide/rafts used for evacuating passenger vessels, such as aircraft. Other examples relate to sustaining the inflation of individual tubes that communicate with one another in evacuation slides, evacuation slide/rafts, life rafts and/or other inflatable devices.

BACKGROUND

Inflatable slides or slide/rafts for evacuation of aircraft or other vessels are well known. Such slides or slide/rafts are typically stowed on-board the aircraft in uninflated states and are mounted on, in, or near exit doors. When the doors are opened for an emergency exit, the slides or slide/rafts are designed to inflate automatically for use by passengers and crew in exiting the aircraft.

In some instances, gravity alone usually supplies sufficient force to position a slide or slide/raft pack clear of the opening door. Conventional evacuation systems have not required additional assistive force to deploy slide packs from their enclosures upon opening of the associated doors. However, in some instances, gravity may not cause the slide packs to fall downward quickly enough to avoid being dragged forward (outward) together with their enclosures. This can cause a jam of the doors or an undesirable twist during slide or slide/raft deployment.

Other slide or slide/raft deployments may occur from within a packboard. The packboard has upper and lower lacing covers that are laced and enclose the folded evacuation slide or slide/raft. One example is illustrated by FIG. 9. For such systems, the packboard is generally mounted to a door. For deployment, as the door moves and as the slide or slide/raft moves out of the packboard, a cable is tensioned (in part due to the weight of the slide or slide/raft as gravity pulls it from the packboard.) This movement activates a release mechanism, which begins the inflation process. The weight from the evacuation slide or slide/raft removes a release mechanism cable, allowing the shaft to freely rotate. Rotation of the shaft releases loops of the lacing cover, allowing the slide or slide/raft unit to exit the packboard. Extension of the girt pulls the inflation system cable and inflates the slide or slide/raft.

In other aircraft designs, an enclosure is provided that more fully encloses or otherwise houses a folded evacuation slide or slide/raft. This example is illustrated by FIGS. 10A and 10B. The enclosure is generally mounted to the outside of an aircraft and houses a folded inflatable evacuation slide or slide/raft. The enclosure may also have a lacing cover to hold the slide or slide/raft in place, as well as a door panel. There are also instances in which a longer slide or slide/raft is to be packed into a standard-sized enclosure. One example of which is illustrated by FIG. 11. In any of these examples, enhanced ejection can be useful in order to provide slide or slide/raft ejection out of the packboard or enclosure.

For example, there may be instances in which the packboard or enclosure are not positioned so that the weight of the slide or slide/raft allows gravity to encourage its release. For example, if the packboard or enclosure are mounted on or near a wing, gravity may not cause the slide or slide/raft to fall from the packboard or enclosure at all. In short, the packboard or enclosure may be in a configuration in which the inflatable does not automatically fall via gravity at all, but for which an ejector bag is useful for release.

In order to furnish gravity-assisting forces to facilitate slide or slide/raft pack deployment (for both gravity release systems that may benefit from a faster release, as well as for systems in which gravity does not cause release of the inflatable at all), an ejector bag can be used to force a slide or slide/raft pack downward, increasing its initial downward velocity. This increased initial downward velocity helps the slide or slide/raft pack clear the enclosure before it can cause jamming of the opening door or otherwise twist or flip the inflatable into an undesirable orientation. Ejector bags are inflated with their own system, which is a system that is separate from the system used to inflate the evacuation slide or slide/raft.

An inflator assembly is generally connected to an ejector bag via flexible tubing. The inflator assembly includes a sealed, high-pressure cartridge of inflation gas, an inflation cable, and a plunger configured to pierce the cartridge. When the inflation cable tenses, the plunger pierces the cartridge, causing inflation gas to flow through the flexible tubing and thereby inflate the ejector bag. Examples of such ejector bags are shown and described by U.S. Pat. No. 9,139,305. However, improvements to ejector bag inflation processes are desired. Accordingly, it is believed that the self-closing valves described herein may find particular use in such improvements.

BRIEF SUMMARY

Embodiments of the invention described herein thus provide systems and methods for inflating various inflatable structures or chambers, either sequentially, concurrently, or both. The valve may also be used to sustain individual inflatable tubes communicated to each other.

In one example, the self-closing valves for an inflatable structure generally feature an inlet configured to cooperate with an inflator via first tubing, a valve closing feature comprising a first end and a second end, a poppet connected to the first end of the valve closing feature, and the second end of the valve closing feature configured to be secured to a surface of the inflatable structure. The valve closing feature may be positioned internal to the inflatable structure and the second end of the valve closing feature may be secured to an internal surface of the inflatable structure. In another example, the valve closing feature is positioned external to the inflatable structure and the second end of the valve closing feature is secured to an external surface of the inflatable structure.

The valve closing feature may be a cable, a cord, a line, a rope, a lanyard, a fabric strip, or a webbing. It is generally provided in a loose configuration that can be tensioned into an extended configuration.

There is also provided an inflation system, comprising: a first inflatable structure comprising the self-closing valve described herein and a second inflatable structure comprising a second tubing, wherein the first inflatable structure and the second inflatable structure share a common inflator.

There is further provided an inflatable ejector bag used to inflate an evacuation slide or slide/raft system configured for deployment, the inflatable ejector bag comprising: the self-closing valve of claim 1 connected to the main inflation system used to inflate the evacuation slide or slide/raft. The valve may be configured to shut itself off based on the geometry/shape of the inflatable ejector bag. The valve may be a dry disconnect coupling. The valve of the ejector bag may be used to eject an evacuation slide or slide/raft from a packboard or an enclosure. Additional details are described herein.

BRIEF DESCRIPTION OF THE DRAWINGS

FIG. 4 shows a side cross-sectional view of a self-closing valve in an opened configuration.

FIG. 5 shows a side cross-sectional view of a self-closing valve in a closed configuration.

DETAILED DESCRIPTION

Embodiments of the present disclosure provide a self-closing valve that may be used in various inflation situations. The valve may also be referred to as self-regulating. In certain examples, the valve may find particular use in connection with inflation of ejector bags. In other examples, the valve may be used in connection with other inflatables, such as life rafts, which are required to have multiple chambers for redundancy and/or for use with ramps designed to be used with inflatable life rafts. For example, if the life raft ramp (or an alternate life raft chamber) is punctured in use, it is desirable to prevent the entire life raft itself from deflating. In other examples, the valve may be used in connection with canopies of life rafts that are intended to be self-erecting, such as canopy support tubes or inflatable arch tubes. Similar to the life raft ramps, puncture of the canopy should not cause the remainder of the life raft to deflate. Some of these systems have used one-way valves that allow air to be delivered for inflation, but that do not allow air to escape the inflatable tube or device through the valve once inflated. The self-closing valve described herein allows airflow into separate chambers. In a specific example, the self-closing valve allows airflow to be delivered from a single inflation source.

Accordingly, although the below description relates to use of the self-closing valve for inflation of an ejector bag and a second inflatable structure, it should be understood that the disclosed self-closing valve may be used in connection with any first inflation structure and any second inflation structure. In use, once the first inflation structure has been inflated to a geometry that causes activation of the valve closing feature, the inlet to the first inflation structure is blocked which causes routing of inflation gas to the second inflation structure. Thus, although the below description describes use of the self-closing valve in connection with inflation of an ejector bag, it should be understood that the above and other uses are possible and considered within the scope of this disclosure.

One advantage of the self-closing valves described herein is that they may use a single inflation source for inflating both inflation structures. As a specific example, the self-closing valves disclosed herein may be used to inflate an ejector bag (used for propelling an evacuation slide or slide/raft from a fuselage-mounted enclosure) using the same high pressure reservoir (inflation system) that inflates the unit (evacuation slide or slide/raft). In other words, the valves do not require a separate inflator system. This eliminates the need for an additional firing mechanism, reservoir, valve assembly or chemical gas generator that is typically used for inflating ejector bags.

Figure 1:
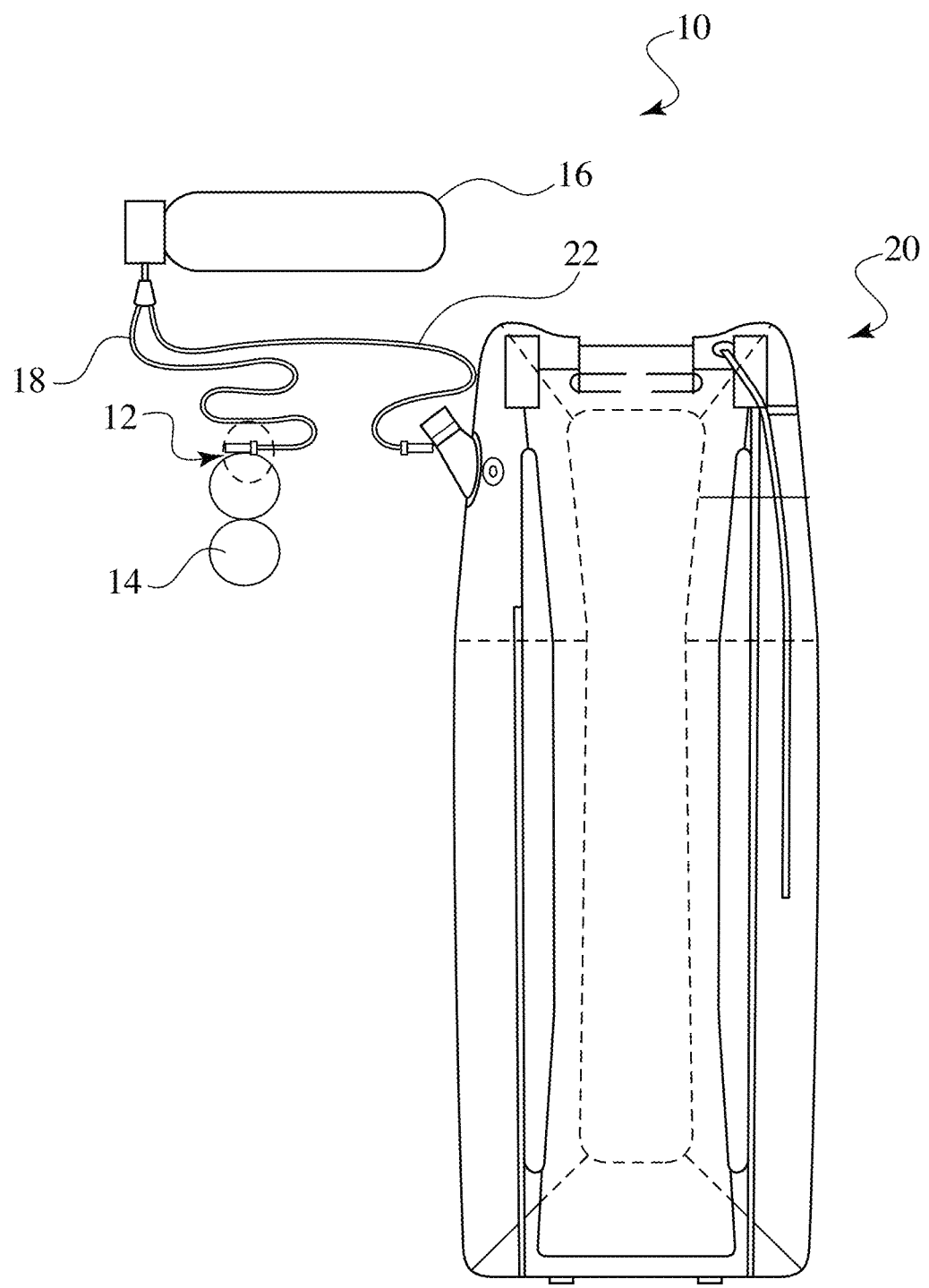
FIG. 1 shows a schematic view of one embodiment of an inflation system described herein.

FIG. 1 illustrates an exemplary inflation system 10 using a self-closing valve 12. In this example, the valve 12 is associated with an ejector bag 14. The valve 12 is fluidly connected to a main inflation system 16 via first tubing 18. An inflatable structure 20 is also associated with the main inflation system 16 via a second tubing 22. In one example, in use, the main inflation system 16 first inflates the first inflatable structure (which is shown as an ejector bag 14, although any other inflatable structure is possible), and then, once the self-closing valve 12 is closed (as described below), inflation gas from the main inflation system 16 is routed to a second inflatable structure 20. In another example, the inflation of both first and second inflatables 14, 20 may take place simultaneously.

Figure 2:
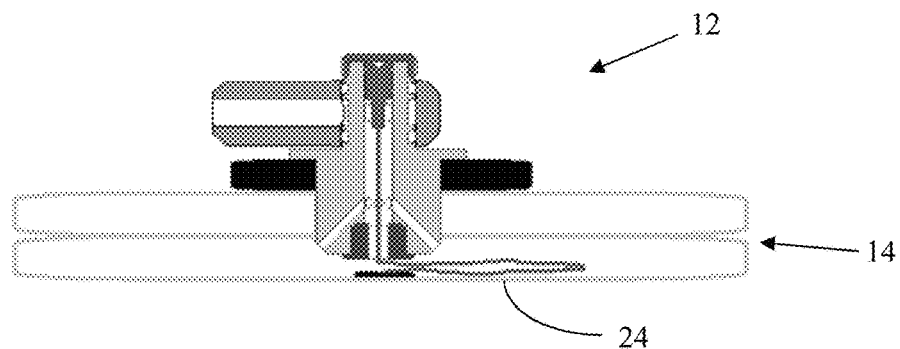
FIG. 2 shows a side cross-sectional view of a self-closing valve installed on a deflated ejector bag.

Referring now to the self-closing valve 12 in more detail, FIG. 2 illustrates an interface between a self-closing valve 12 and an ejector bag 14. As illustrated, the self-closing valve 12 is associated with a valve closing feature 24, such as a cable or lanyard as shown. The valve closing feature 24 provides a poppet closing function. More specifically, the valve closing feature 24 may be provided as a cable (such as a stainless steel cable or any other cable), a cord (such as a nylon-coated cord or any other cord), a line, a rope, a lanyard, a fabric strip, or any other feature that can be provided in the loose configuration of FIG. 2 and that can be extended to the configuration of FIG. 3 upon inflation, or any other type of material that may be tensioned and released.

Figure 3:
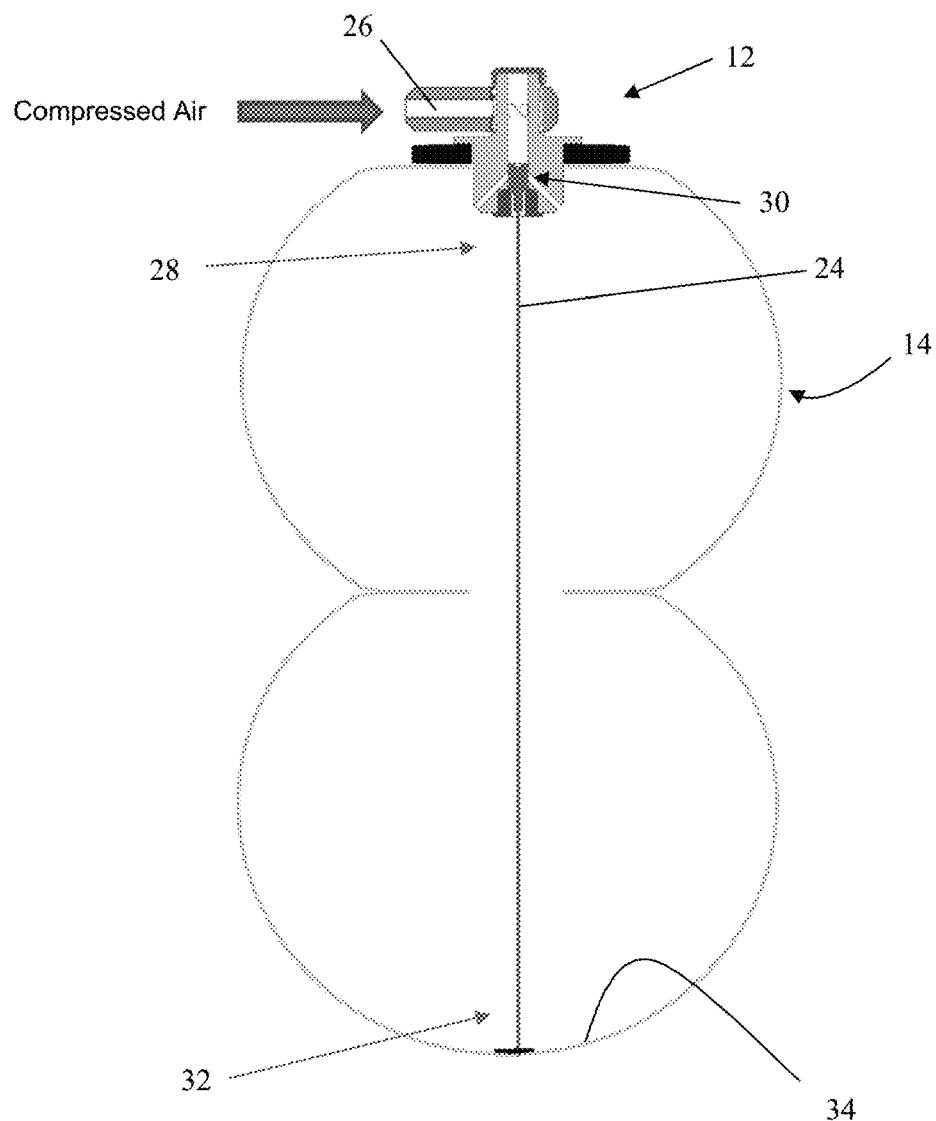
FIG. 3 shows a side cross-sectional view of a self-closing valve used to inflate an ejector bag.

In use, compressed air is injected into valve inlet 26. Once the ejector bag 14 (or other inflatable device that is to be inflated via use of the self-closing valve 12) has been inflated to the desired status, the valve closing feature 24 is extended to its fullest amount. This is illustrated by FIG. 3. The valve closing feature 24 generally has one end 28 secured to a valve poppet 30 and its other end 32 secured to an interior wall 34 of the ejector bag 14 (or other inflatable device). In use, delivery of inflation air causes expansion of the ejector bag 14 (or other inflatable device) which in turn causes extension or stretching of the valve closing feature 24. Once the ejector bag 14 (or other inflatable device) has been inflated to the desired geometry, the valve closing feature 24 is fully extended and pulls in an opposite direction/away from the self-closing valve 12. Because the end 28 of the feature 24 is secured to a valve poppet 30, this extension upon inflation pulls the valve poppet 30 closed. The valve features are illustrated more fully by FIGS. 4 and 5.

In FIG. 4, the self-closing valve 12 is shown in an open configuration (e.g., prior to and during inflation). As shown, the valve inlet 26 cooperates with an internal channel 36 of the valve 12. In use, the self-closing valve 12 may be fluidly connected to the main inflation system through flexible or rigid tubing. Upon activation of the system, compressed air flows through the self-closing valve 12 and into an inflatable chamber of an inflatable device. Because the valve closing feature 24 has not been pulled to its fully extended position, the self-closing valve 12 remains open and inflation air is delivered to the inflatable structure (e.g., ejector bag 14).

During inflation, expansion of the inflatable chamber will self-tension the poppet closing cable feature 24. When sufficient tension is applied, the poppet 30 is pulled into the closed position, preventing additional gas from entering into the inflatable chamber. In FIG. 5, the self-closing valve 12 is shown in a closed configuration (e.g., once the valve closing feature 24 has been activated). In this figure, the valve closing feature 24 has been pulled, such that the poppet 30 closes the valve inlet 26. Inflation air is no longer delivered to the inflatable structure (e.g., ejector bag), but is now allowed to be delivered elsewhere. Referring back to FIG. 1, in this example, once the ejector bag 14 has been inflated and the self-closing valve 12 has been closed, inflation air from the main inflation system 16 is then routed directly to the inflatable structure 20, which, in this example, is an evacuation slide or slide/raft. As outlined further below, it is also possible for the inflation to be concurrent, such that both inflatable structures are inflated together or otherwise simultaneously. In other examples discussed below, it is also possible to use the self-closing valve disclosed herein for sequential inflation of more than one inflatable structure.

In a specific embodiment, the self-closing valve 12 may have a banjo fitting and a poppet with a poppet closing cable. The banjo fitting may be used to allow the valve to swivel or turn with respect to the inflatable structure. Such fittings are well-known and not described further herein.

Figure 7:
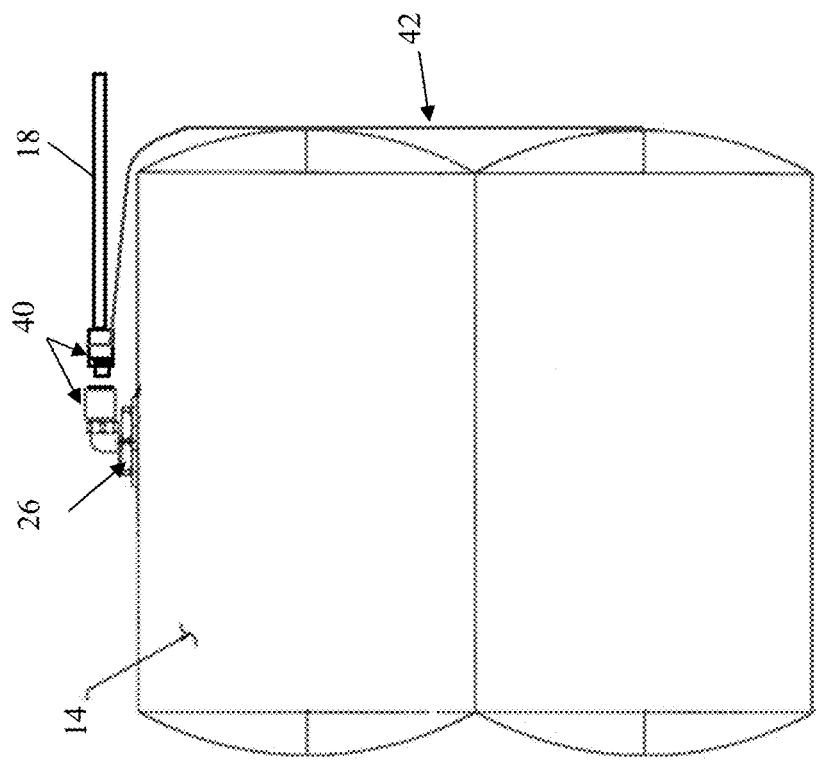
FIG. 7 shows a side cross-sectional view of a dry disconnect valve installed on an inflated ejector bag, with tubing in the process of disconnecting.
Figure 6:
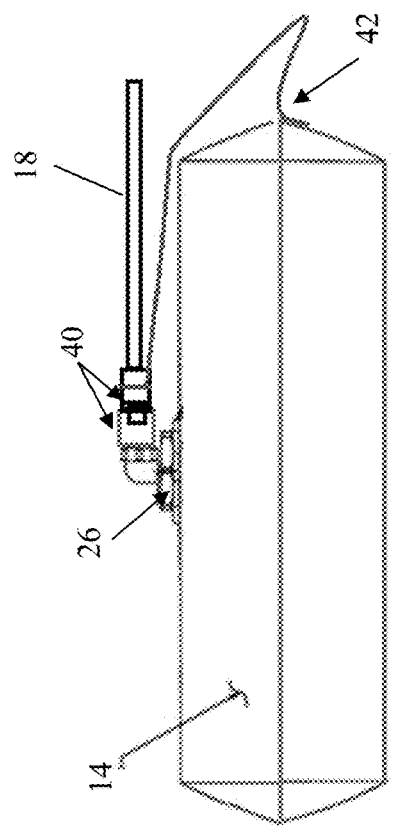
FIG. 6 shows a side cross-sectional view of a dry disconnect valve installed on an ejector bag.

In another embodiment, the self-closing valve 12 may be used as a dry disconnect coupling 40. Examples are illustrated by FIGS. 6 and 7. This option allows the inflation of the ejector bag 14 (or other inflatable device) with air from the main inflation system, continuing to eliminate the need for a separate inflation system. This option also uses a triggering mechanism similar to the self-regulating check valve.

In one example, the dry disconnect coupling 40 is self-regulating in that it allows air to pass through to, but not be released from, the ejector bag 14. The dry disconnect coupling 40 will be connected to the main inflation system 16 through flexible or rigid tubing 18. (This may be the same configuration as shown by FIG. 1.) Upon activation of the system, compressed air will flow through the tubing 18 into the dry disconnect coupling 40 and into the inflatable chamber 14. The expansion of the inflatable chamber 14 will self-tension the release strap 42. In this example, the release strap 42 functions as the valve closing feature. In this example, the release strap 42 is positioned external to the chamber 14. The release strap 42 may be in the form of a webbing, cable, cord, or any other material that may be tensioned, or any of the options described above for the valve closing feature 24. When sufficient tension is applied to the release strap 42, the dry disconnect coupling 40 is automatically disengaged, preventing additional gas from entering into the inflatable chamber. FIG. 7 illustrates the dry disconnect 40 decoupling from the inflatable structure inlet 26, due to tensioning of the release strap 42.

Figure 8A:
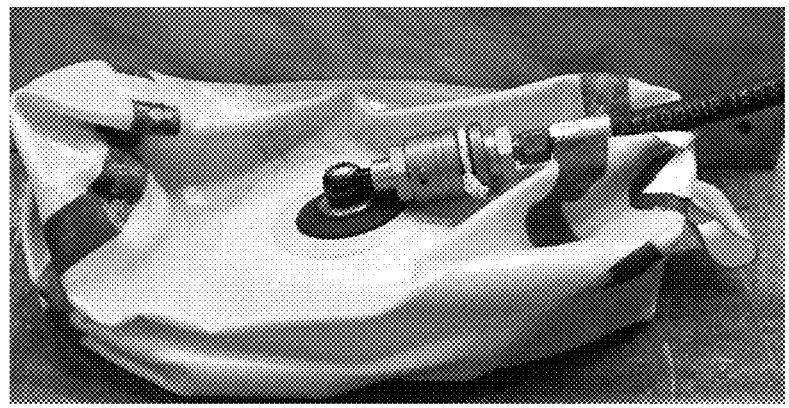
FIGS. 8A-8C show various stages of inflation of a dry disconnect valve used to inflate an ejector bag.
Figure 8B:
Figure 8C:
Figure 9:
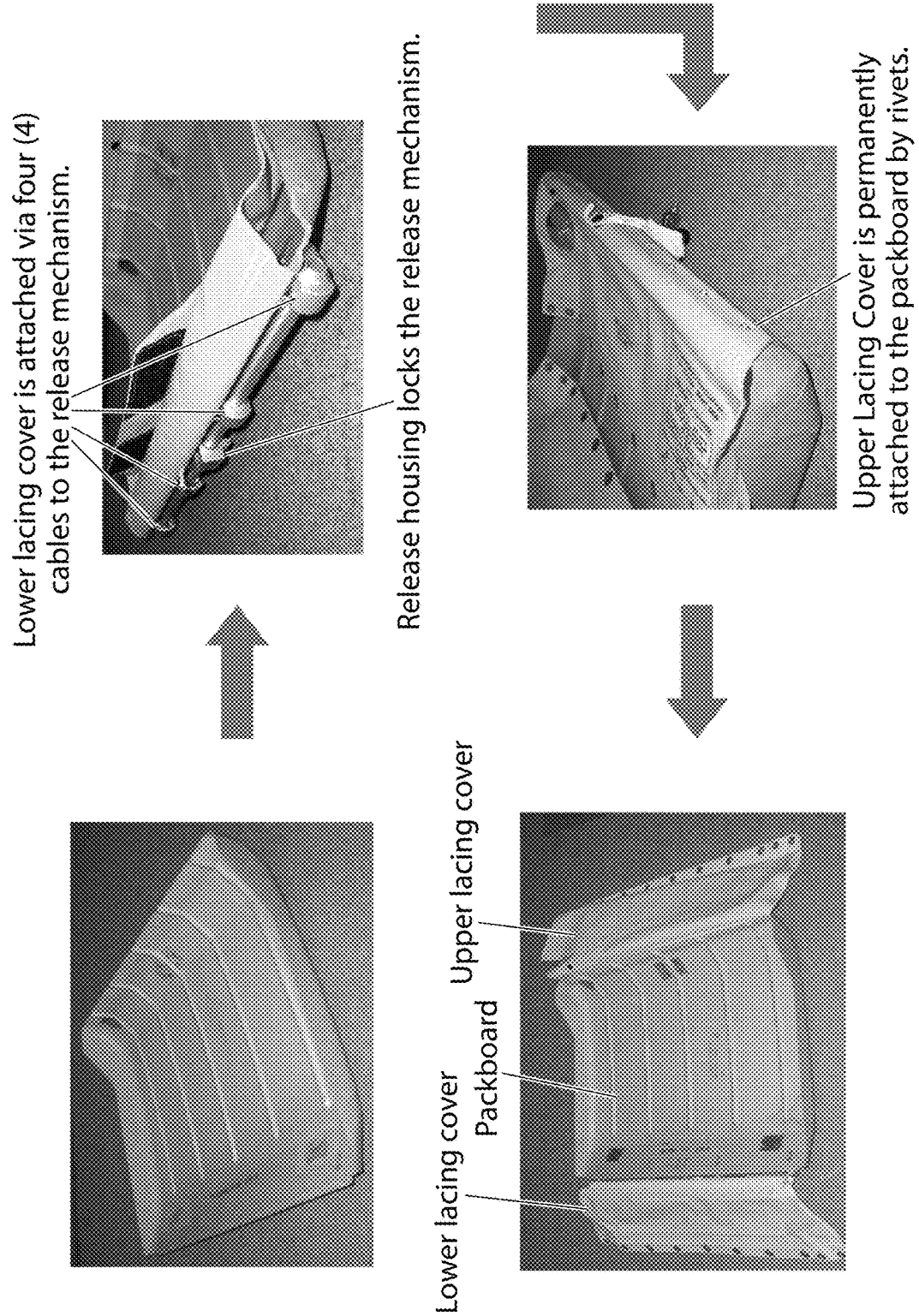
FIG. 9 shows a packboard configuration that may be used to house an inflatable evacuation slide or slide/raft.
Figure 10A:
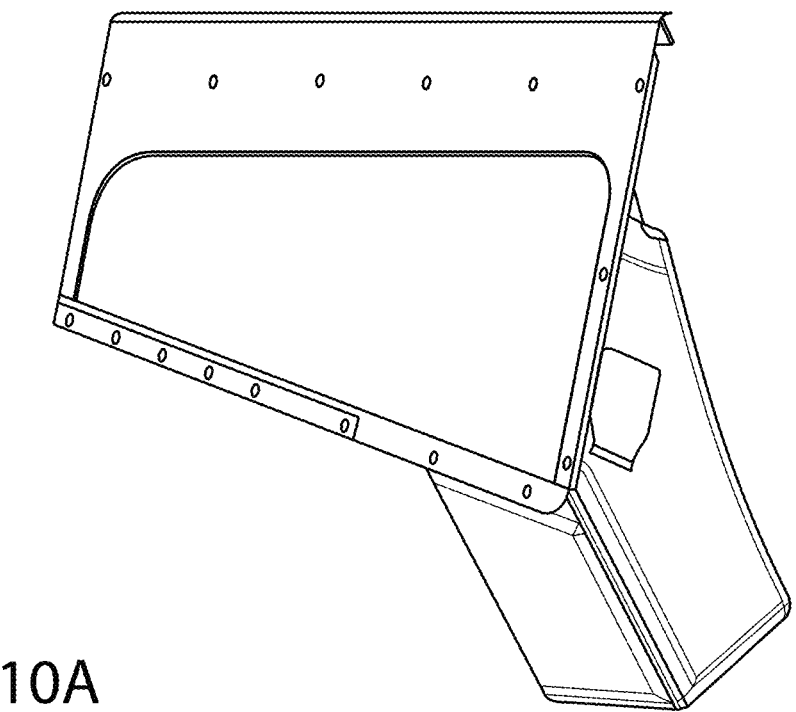
FIGS. 10A and 10B show an enclosure that may be used to house an inflatable evacuation slide or slide/raft.
Figure 10B:
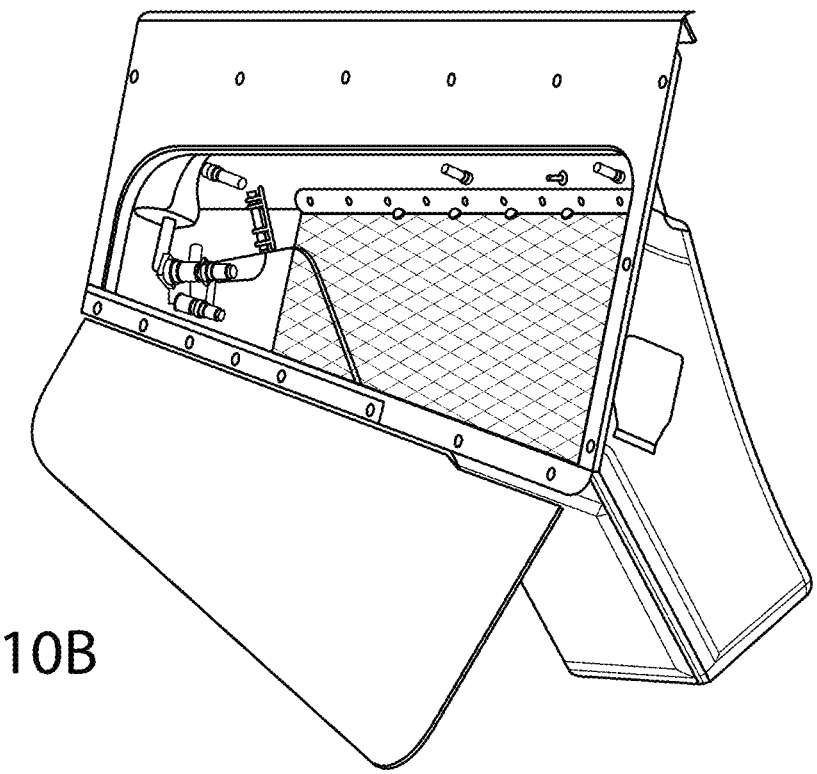
Figure 11:
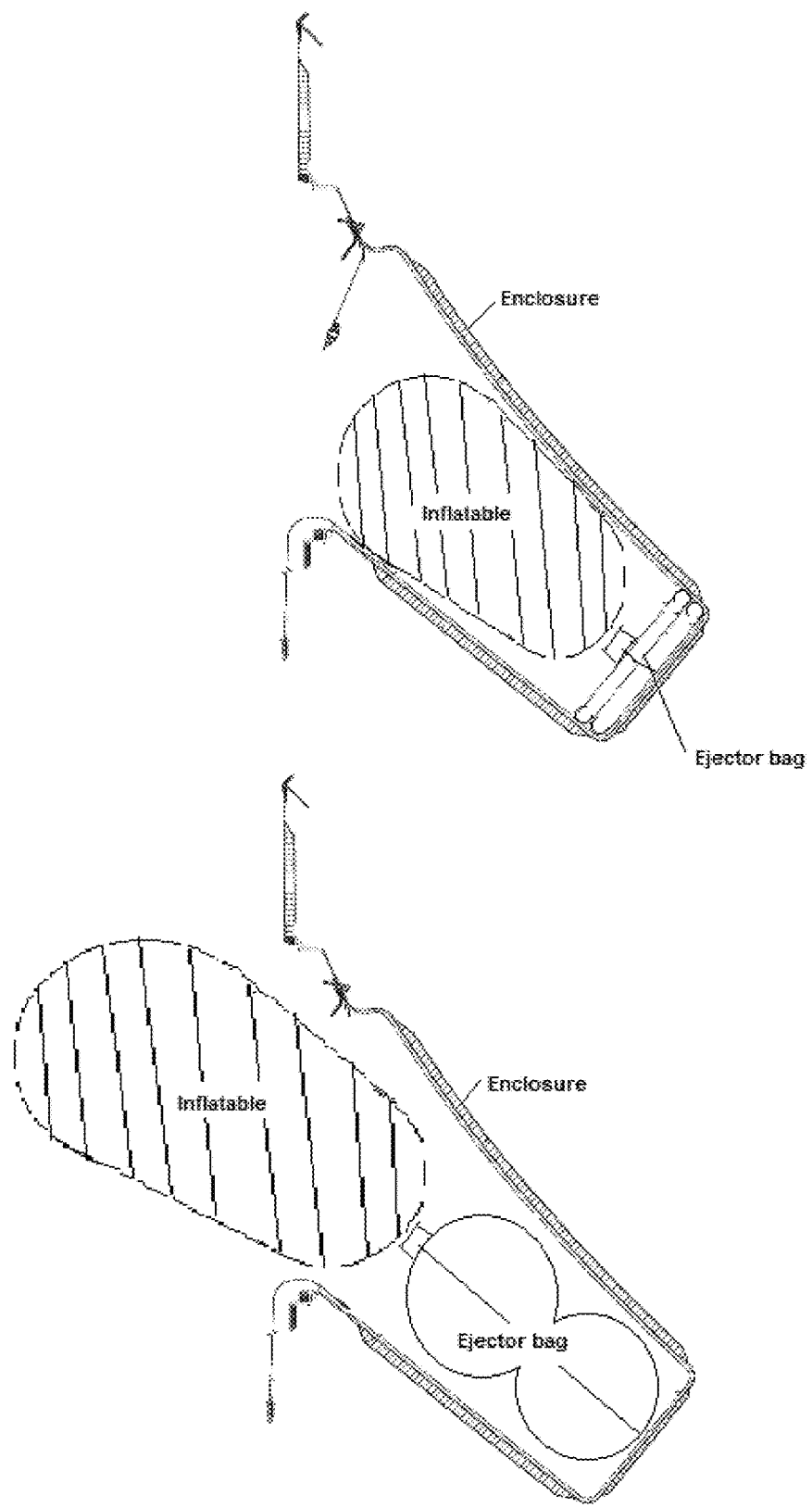
FIG. 11 shows an enclosure that illustrates a general configuration in which the inflatable slide or slide/raft does not automatically fall via gravity, but for which an ejector bag is useful for release.

FIGS. 8A-8C illustrate various embodiments of inflation of an ejector bag using a dry disconnect valve.

In an alternate embodiment, the disclosed valve provides a means for sustaining the inflation of individual tubes communicated to each other in evacuation slides, evacuation slide/rafts, life rafts or other inflatable devices using the self-closing valve or dry disconnect valve described herein. Inflatable devices that are made of at least two individual tubes that are communicated to each other can benefit from being inflated from the same inflation source. Federal Aviation Administration (FAA) regulations require that if one tube is compromised (can no longer hold air) the other tube must be able to remain inflated. Accordingly, if each tube is provided with its own self-closing valve or dry disconnect valve, concern that all tubes would deflate if one were to be compromised is significantly lessened. For instance, if each tube were to have a valve (12 or 40) connected to the main inflation system, then the tubes would be filled individually and would not be dependent on each other.

In another specific example, the disclosed valve could prevent buoyancy tubes from deflating on a life raft should a ramp or canopy support tube be punctured. The same could be said of the ramp and the canopy support tube should the buoyancy tubes be punctured; and/or the canopy support tube should the ramp or buoyancy tubes be punctured. The general goal is to provide each inflatable portion of a structure with its own self-closing valve in order to maintain integrity of the remainder of the structure upon damage to one of the inflatable portions.

In another example, use of a self-closing valve could prevent an evacuation slide or slide/raft from deflating if the ramp to the slide is punctured.

An additional embodiment includes a feature implemented on the valve to make it self-locking. This feature would retain the valve in the closed position if it is used on an evacuation slide, evacuation slide/raft, life raft or other inflatable device that has multiple inflated tubes.

In an alternate embodiment, the valve closing feature may incorporate a spring or other automatic push back feature. If provided, the spring could be used to help push the poppet back into an open position. This could be useful in the event of vibration of the aircraft or vehicle during use. Additionally or alternatively, it is possible to provide a detent feature that could maintain the poppet in an open position, such that the poppet is biased in the open position. Alternate embodiments include frangible poppets or poppets that function via one or more magnetic features.

Figure 12A:
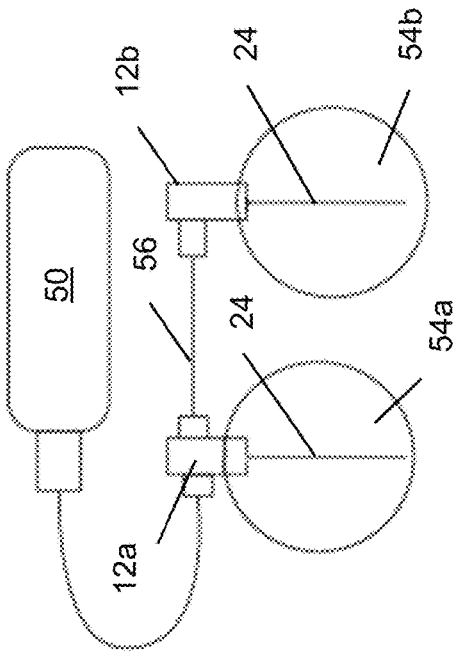
FIGS. 12A-12C show various sequential or simultaneous inflation options.

In addition to the ejector bag and multiple tube inflation embodiments disclosed (life rafts, life raft ramps, canopies, canopy support tubes), it may also be possible to use the disclosed self-closing valve for sequencing the inflation of various inflatable components, such as tubes or chambers of a single inflatable component or multiple separate inflatable structures. As illustrated by FIG. 12A, a single inflation source 50 may be used to inflate two separate inflatable tubes 52 that are fluidly connected by a valve 12. In one example, a single tubing 18 delivers inflation air directly into a first tube 52a. The inflation valve for delivery of inflation air to the first tube 52a may be any standard inflation valve (not shown). First tube 52a and second tube 52b are fluidly cooperable with one another via self-closing valve 12. As first tube inflates, inflation air is also delivered to the second tube 52b. This may occur via the valve being designed as having flow through features, illustrated by FIGS. 14 and 15 and described further below. This delivery may be simultaneous. In another example, this delivery may be sequential. Once the second tube 52b has inflated to its intended capacity, the valve closing feature 24 will extend and close the poppet of valve 12 as described herein. Back flow of air through the valve of the first tube 52a can trigger the inflation source to stop inflation.

Figure 12B:
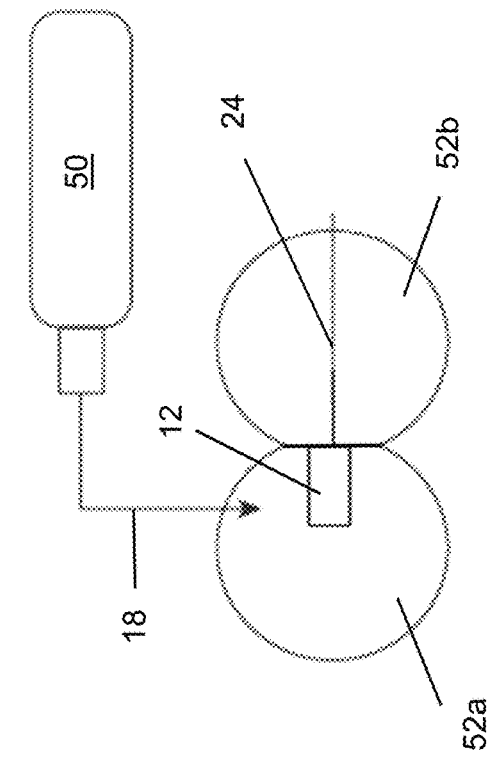

In an alternate example illustrated by FIG. 12B, two separate inflatable structures 54 may be fluidly connected via valve connection tubing 56. A first inflatable structure 54a is shown as fluidly connected to the inflation source 50 via first tubing and using a first valve 12a. A second inflatable structure 54b is shown as fluidly connected to the first inflatable structure 54a via valve connection tubing 56 and using a second valve 12b. In use, inflation air from the inflation source 50 is delivered to the first inflatable structure 54a, as well as to the second inflatable structure 54b. This delivery may be simultaneous. In another example, this delivery may be sequential. This delivery may be via valves having flow through features. Once each inflatable structure has been inflated to the intended capacity, the valve closing feature 24 activates each of the respective self-closing valves 12a, 12b to close.

Figure 12C:
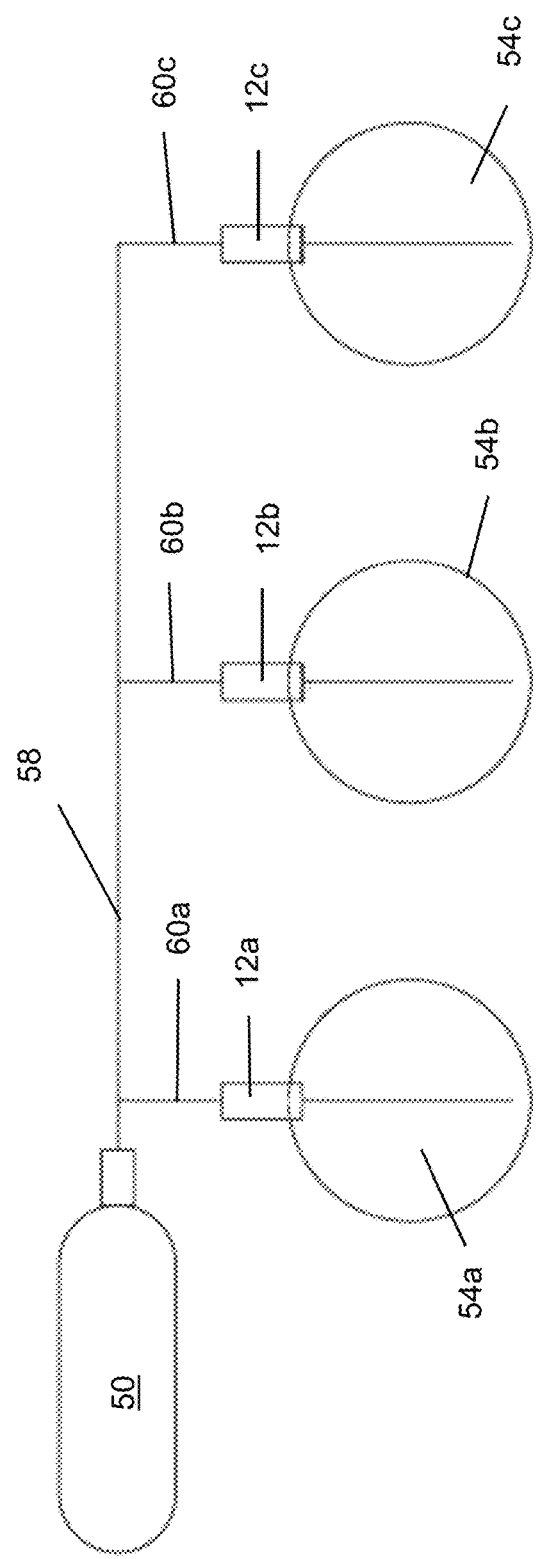
Figure 13A:
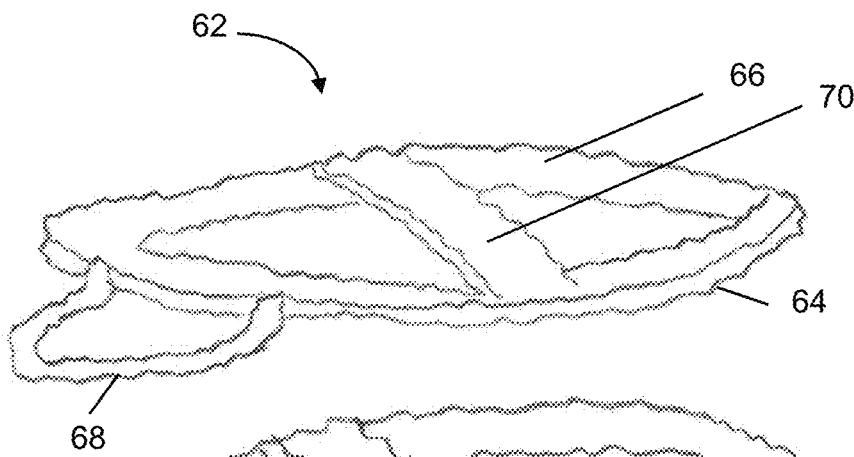
FIGS. 13A-13E illustrate a life raft inflation sequence.
Figure 13B:
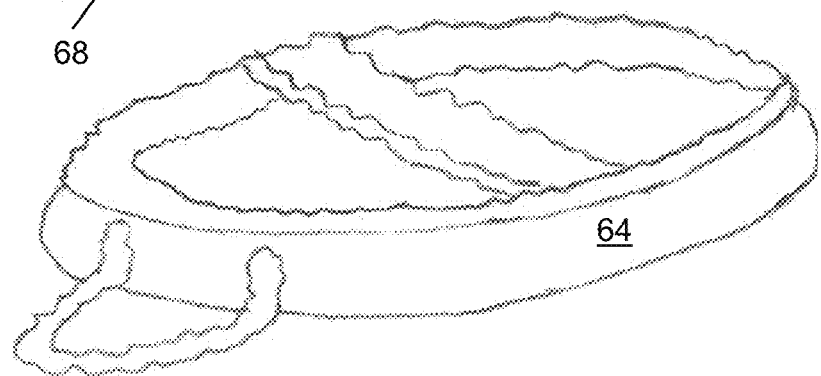
Figure 13C:
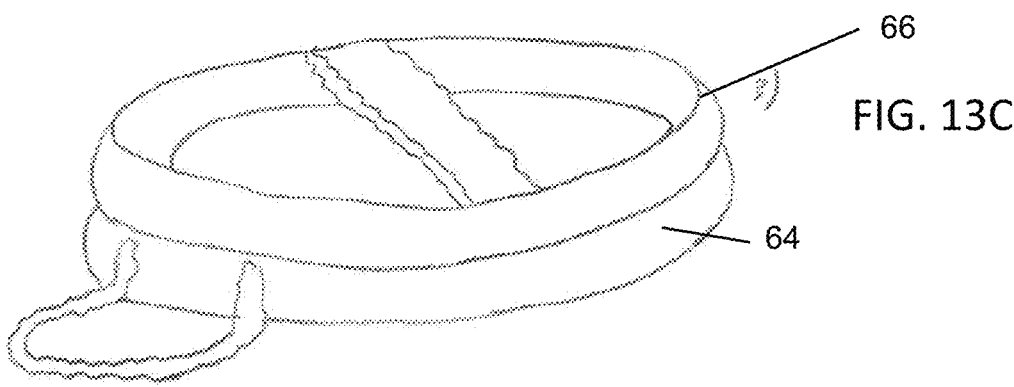
Figure 13D:
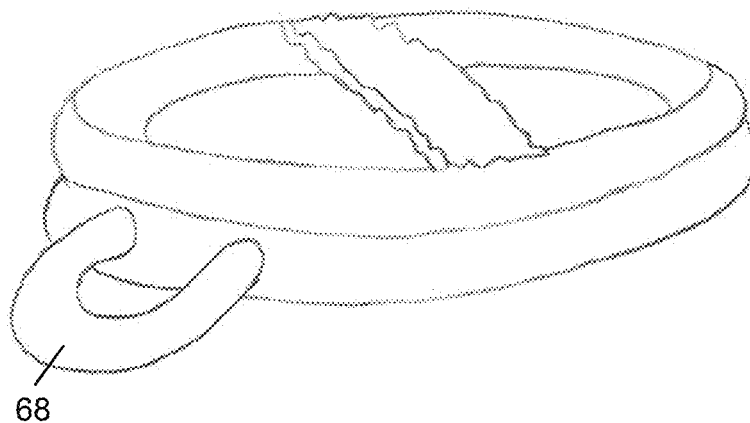
Figure 13E:
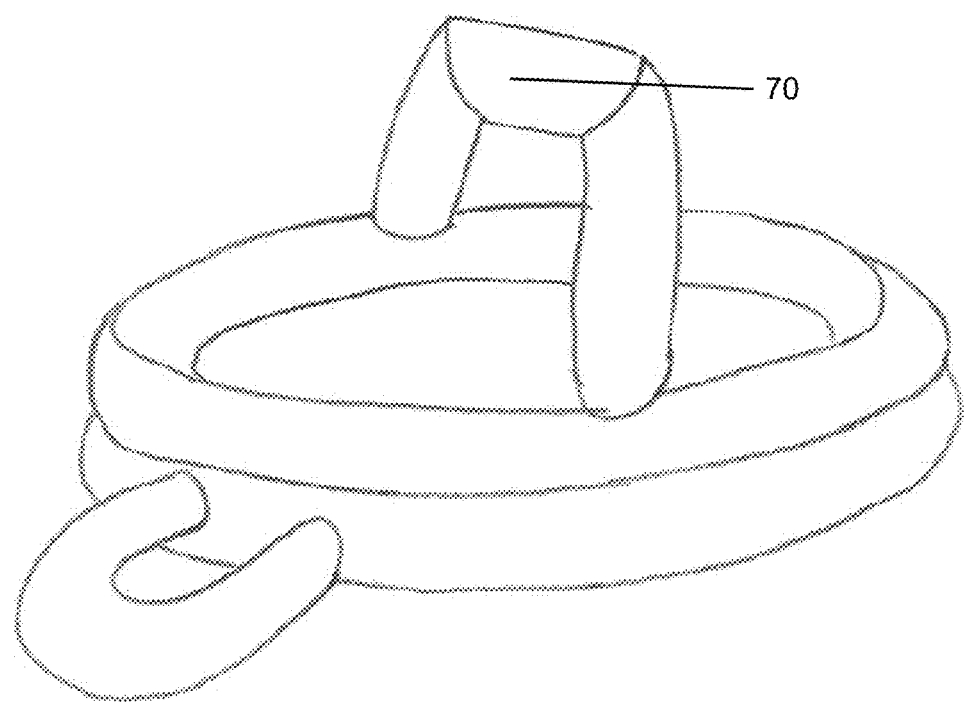

In a further example, more than two separate inflatable structures 54 may be inflated using the systems described herein. As illustrated by FIG. 12C, an inflation source 50 may deliver inflation air to a plurality of inflatable structures 54. A single inflation line 58 may branch into individual inflation hoses 60a, 60b, and 60c (and more may be provided, depending upon the number of inflatable structures to be inflated). Each inflatable structure 54a, 54b, 54c may be provided in series with one another and each having its own valve 12a, 12b, 12c. Air delivery may be simultaneous. In another example, air delivery may be sequential.

FIG. 13 illustrates one example of a possible inflation sequence used in connection with a life raft. Although described and shown with respect to inflation of a life raft, it should be understood that sequential inflation may be used for any types of inflatable structures or chambers. FIG. 13A illustrates a life raft 62 with a lower tube 64, an upper tube 66, a ramp 68, and a canopy support tube 70, all in the deflated configuration. FIG. 13B illustrates the lower tube 64 inflated. Inflation of the lower tube 64 before the other features may be accomplished by use of the self-closing valve described herein. FIG. 13C illustrates both the lower tube 64 and the upper tube 66 inflated. This sequential inflation may be accomplished via use of the self-closing valve described herein. FIG. 13D illustrates the ramp 68 in an inflated configuration, and FIG. 13E illustrates the canopy support tube 70 (and the remainder of the raft components) in an inflated configuration. These sequential inflations may take place via a self-closing valve being positioned between each of the separate chambers 64, 66, 68, and 70.

Figures 14A, 14B:
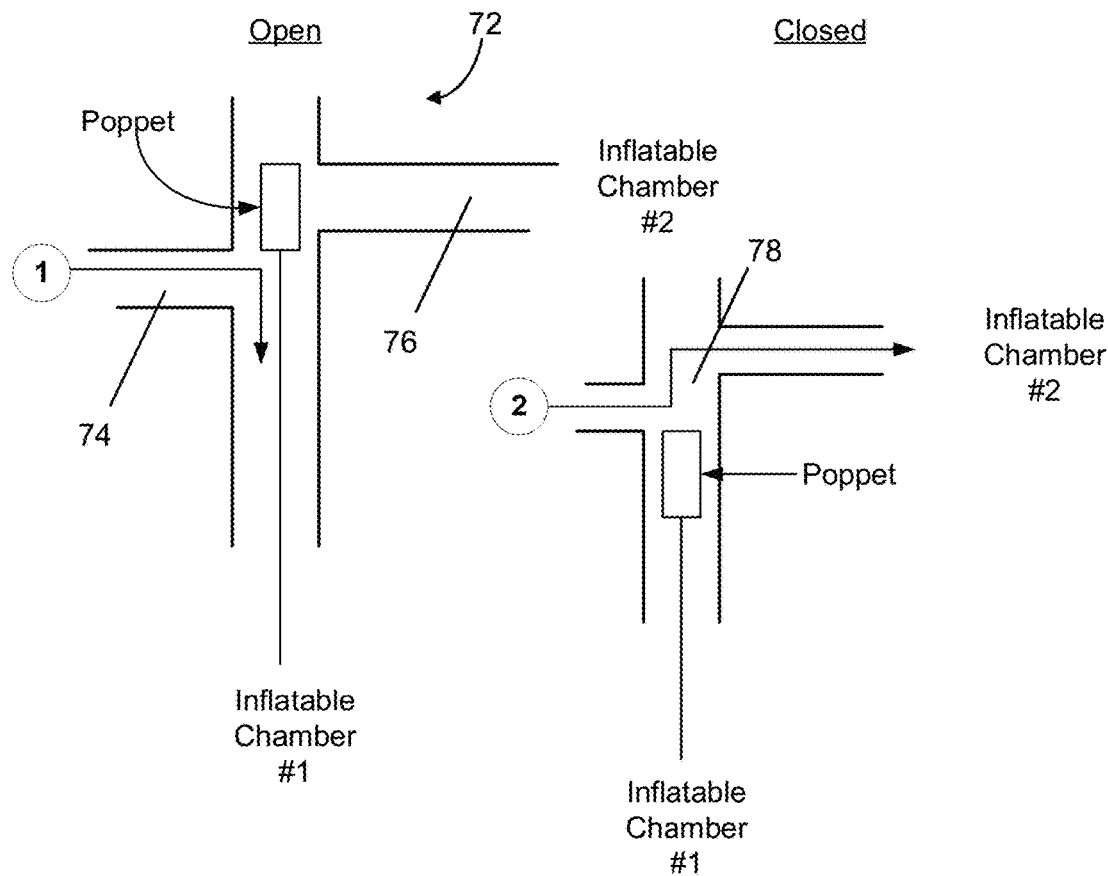
FIGS. 14A and 14B illustrate a schematic view of flow-through features for a valve.
Figures 15A, 15B:
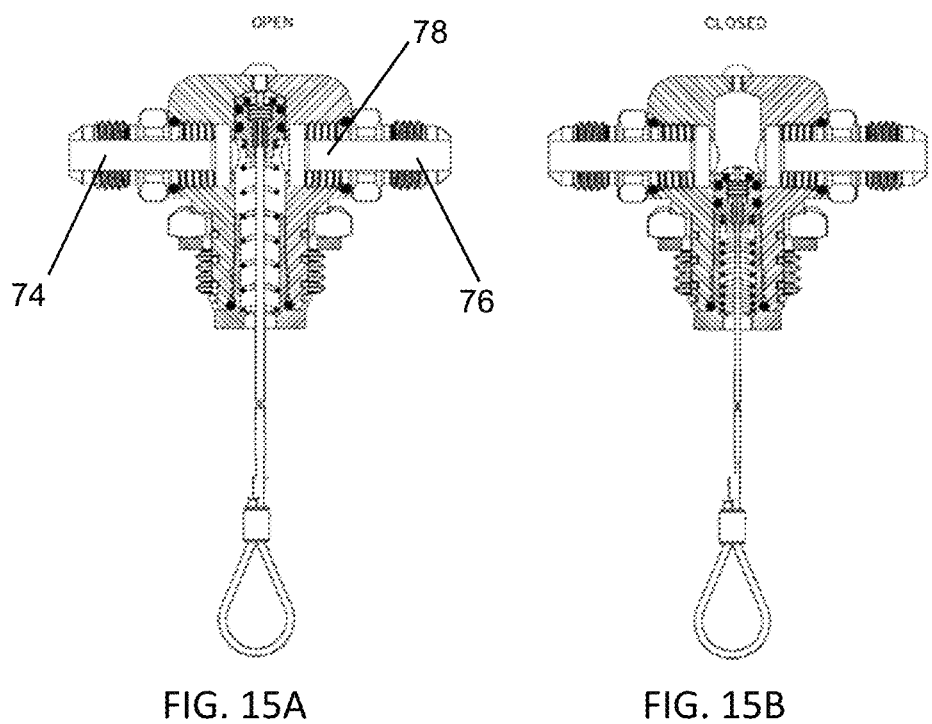
FIGS. 15A and 15B illustrate alternate flow-through features for a valve.

FIGS. 14 and 15 illustrate examples of flow-through features 72 that may be provided in connection with self-closing valves described herein. FIGS. 14A and 14B show examples of flow-through features in schematic form, with FIG. 14A illustrating an open valve and FIG. 14B illustrating a closed valve. FIGS. 15A and 15B show examples of flow-through features in one specific valve embodiment, with FIG. 15A illustrating an open valve and FIG. 15B illustrating a closed valve. A valve having a flow-through feature is generally provided as having an inlet 74 and an outlet 76. The inlet 74 generally cooperates with tubing leading directly from an inflation source or valve connection tubing 56 (extending from a previous valve in a series). The outlet 76 generally cooperates with a valve connection tubing 56, leading to another valve downstream in a series. These flow-through features 72 close similarly to those described above, using a valve closing feature 24 connected to an internal wall of an inflatable structure or inflatable chamber. FIG. 14 illustrates that internal channel 78 may be offset between the inlet 74 and the outlet 76. FIG. 15 illustrates that the internal channel 78 may be aligned between the inlet 74 and the outlet 76.

Changes and modifications, additions and deletions may be made to the structures and methods recited above and shown in the drawings without departing from the scope or spirit of the disclosure or the following claims.

What is claimed is:

1. A method for inflating an ejector bag used to propel an evacuation slide or slide/raft from an aircraft-mounted enclosure, the method comprising:
    providing an inflator, wherein in use, the inflator inflates both the ejector bag and the evacuation slide or slide/raft;
    the ejector bag equipped with a self-closing valve comprising: an inlet configured to fluidly communicate with the inflator via a first tubing,
    a valve closing feature comprising a first end and a second end,
    a poppet connected to the first end of the valve closing feature,
    the second end of the valve closing feature configured to be secured to a surface of the ejector bag,
    wherein upon activation of the inflator, inflation air is delivered to the ejector bag, causing the ejector bag to inflate, which forces the evacuation slide or slide/raft out of the aircraft-mounted enclosure.

2. The method of claim 1, wherein the valve closing feature is positioned internal to the ejector bag and wherein the second end of the valve closing feature is secured to an internal surface of the ejector bag.

3. The method of claim 1, wherein the valve closing feature is positioned external to the ejector bag and wherein the second end of the valve closing feature is secured to an external surface of the ejector bag.

4. The method of claim 1, wherein the valve closing feature comprises a cable, a cord, a line, a rope, a lanyard, a fabric strip, or a webbing.

5. The method of claim 1, wherein the valve closing feature comprises a feature that can be provided in a non-tensioned configuration and that can be tensioned into a tensioned configuration.

6. The method of claim 1, used for sequential inflation of the ejector bag and then the evacuation slide or slide/raft.

7. The method of claim 1, used for concurrent inflation of the ejector bag and the evacuation slide or slide/raft.

8. The method of claim 1, wherein upon inflation of the ejector bag, the valve closing feature is extended to its fullest amount and pulls away from the valve, causing the valve to shut itself off due to expansion of the ejector bag.

9. An inflation system method for inflating an ejector bag used to propel an evacuation slide or slide/raft from an aircraft-mounted enclosure, the method comprising:
   providing an ejector bag equipped with a self-closing valve comprising: an inlet configured to fluidly communicate with an inflator via a first tubing, a valve closing feature comprising a first end and a second end, a poppet connected to the first end of the valve closing feature, the second end of the valve closing feature configured to be secured to a surface of the ejector bag,
   providing an evacuation slide or slide/raft comprising a second tubing,
   wherein the ejector bag and the evacuation slide or slide/raft share the inflator,
   wherein the ejector bag is in fluid communication with the inflator via the first tubing and wherein the evacuation slide or slide/raft is in fluid communication with the inflator via the second tubing,
   wherein upon activation of the inflator, inflation air is delivered to the ejector bag, causing the ejector bag to inflate, which forces the evacuation slide or slide/raft out of the aircraft-mounted enclosure.

10. The method of claim 1, wherein the self-closing valve comprises a dry disconnect coupling.

\* \* \* \* \*